United States Patent
Brenner et al.

(10) Patent No.: US 8,974,977 B2
(45) Date of Patent: Mar. 10, 2015

(54) WET SIDE PAPER FOR FUEL CELL HUMIDIFIER

(75) Inventors: Annette M. Brenner, Honeoye Falls, NY (US); Robert E. Evans, Huntington, CT (US)

(73) Assignee: GM Global Technology Operations LLC, Detroit, MI (US)

( * ) Notice: Subject to any disclaimer, the term of this patent is extended or adjusted under 35 U.S.C. 154(b) by 452 days.

(21) Appl. No.: 13/446,147

(22) Filed: Apr. 13, 2012

(65) Prior Publication Data

US 2012/0264026 A1    Oct. 18, 2012

Related U.S. Application Data

(60) Provisional application No. 61/475,843, filed on Apr. 15, 2011.

(51) Int. Cl.
*H01M 8/06* (2006.01)
*H01M 8/04* (2006.01)
*B01D 63/08* (2006.01)
*H01M 8/10* (2006.01)

(52) U.S. Cl.
CPC ........... *H01M 8/04149* (2013.01); *B01D 63/08* (2013.01); *H01M 2008/1095* (2013.01); *Y02E 60/50* (2013.01)
USPC ............................ 429/413; 428/220; 429/400

(58) Field of Classification Search
CPC ............. B01D 63/08; H01M 8/04149; H01M 2008/1095; Y02E 60/50
USPC ........................................... 429/413; 428/220
See application file for complete search history.

(56) References Cited

U.S. PATENT DOCUMENTS

| | | | |
|---|---|---|---|
| 7,875,396 B2 | 1/2011 | Zhang et al. | |
| 8,137,853 B2 | 3/2012 | Zhang et al. | |
| 2005/0191530 A1* | 9/2005 | Mossman | 429/13 |
| 2006/0046926 A1* | 3/2006 | Ji et al. | 502/101 |
| 2006/0204737 A1* | 9/2006 | Ziegler | 428/219 |
| 2009/0092863 A1 | 4/2009 | Skala | |
| 2010/0203400 A1* | 8/2010 | Calis et al. | 429/413 |
| 2011/0053008 A1 | 3/2011 | Brenner et al. | |
| 2012/0070752 A1* | 3/2012 | Guzda et al. | 429/413 |

FOREIGN PATENT DOCUMENTS

| | | |
|---|---|---|
| CN | 1751879 A | 3/2006 |
| CN | 101098021 A | 1/2008 |
| CN | 101924242 A | 12/2010 |
| WO | 2006066304 A1 | 6/2006 |

* cited by examiner

*Primary Examiner* — Gary Harris
(74) *Attorney, Agent, or Firm* — Dinsmore & Shohl LLP (57) ABSTRACT

A glass fiber-based paper diffusion medium, as well as a membrane humidifier for a fuel cell and method for humidifying a fuel cell using the provided glass fiber-based paper diffusion medium. The diffusion medium is a flexible, resin-bonded glass fiber paper impregnated with 26-55% cured liquid phenolic resin and having a thickness of 100-110 μm and a Gurley permeability of at least 100 cfm.

16 Claims, 10 Drawing Sheets

WET SIDE PAPER FOR FUEL CELL HUMIDIFIER

This application claims the benefit of U.S. Provisional Application Ser. No. 61/475,843, filed Apr. 15, 2011. This application relates to a fuel cell and a membrane humidifier for a fuel cell. More particularly, this application relates to diffusion media for use in a membrane humidifier for a fuel cell.

FIELD

Background

Electrochemical conversion cells, commonly referred to as fuel cells, produce electrical energy by processing first and second reactants, e.g., through oxidation and reduction of hydrogen and oxygen. By way of illustration and not limitation, a typical polymer electrolyte fuel cell comprises a polymer membrane (e.g., a proton exchange membrane) that is positioned between a pair of catalyst layers with a pair of gas diffusion media layers outside the catalyst layers. A cathode plate and an anode plate are positioned at the outermost sides adjacent the gas diffusion media layers, and the preceding components are tightly compressed to form the cell unit.

The voltage provided by a single cell unit is typically too small for useful applications. Accordingly, a plurality of cells are arranged and connected consecutively in a "stack" to increase the electrical output of the electrochemical conversion assembly or fuel cell. The fuel cell stack typically uses bipolar plates between adjacent membrane electrode assemblies (MEAs).

In order to perform with the desired efficiency, the polymer membrane needs to be moist. Consequently, it is sometimes necessary to provide humidification to maintain the needed moisture level. This helps to avoid damage to the membrane and the resulting shortened life, as well as to maintain the desired efficiency of operation. For example, a lower water content in the membrane leads to higher proton conduction resistance, resulting in a higher ohmic voltage loss. The humidification of the feed gases, in particular the cathode inlet, is desirable in order to maintain sufficient moisture in the membrane, especially in the inlet region. Humidification in fuel cells is discussed in commonly owned U.S. Pat. Nos. 7,036,466 and 7,572,531, and U.S. patent application Ser. No. 10/912,298.

Air humidifiers are frequently used to humidify the air stream used in the fuel cell in order to maintain the desired moisture level, as described in U.S. Pat. Nos. 6,471,195 and 7,156,379.

Figure 1:
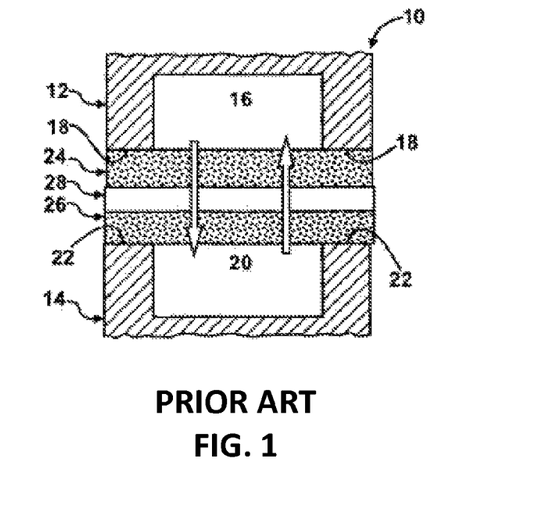
FIG. 1 illustrates a conventional membrane humidifier assembly for a fuel cell.

Membrane humidifiers have also been used to maintain needed moisture levels. For the automotive fuel cell humidification application, a membrane humidifier needs to be compact, exhibit low pressure drop, and have high performance characteristics. FIG. 1 illustrates one example of a conventional membrane humidifier assembly 10 for a fuel cell (not shown). The membrane humidifier assembly 10 includes a wet plate 12 and a dry plate 14. The membrane humidifier assembly 10 for a cathode side of the fuel cell is described. However, it is understood that the membrane humidifier assembly 10 can be used for the anode side of the fuel cell, or otherwise, as desired.

The wet plate 12 includes a plurality of flow channels 16 formed therein. The channels 16 are adapted to convey a wet gas from the cathode of the fuel cell to an exhaust (not shown). As used herein, wet gas means a gas such as air and gas mixtures of $O_2$, $N_2$, $H_2O$, and $H_2$, for example, including water vapor and/or liquid water therein at a level above that of the dry gas. It is understood, however, that other gases or mixtures of gases can be used as desired. A land 18 is formed between adjacent channels 16 in the wet plate 12. Any conventional material can be used to form the wet plate 12, such as steel, polymers, and composite materials.

The dry plate 14 includes a plurality of flow channels 20 formed therein. The channels 20 are adapted to convey a dry gas from a source of gas (not shown) to the cathode of the fuel cell. Dry gas means a gas such as air and gas mixtures of $O_2$, $N_2$, $H_2O$, and $H_2$, for example, absent water vapor or including water vapor and/or liquid water therein at a level below that of the wet gas. It is understood, however, that other gases or mixtures of gases can be used as desired. A land 22 is formed between adjacent channels 20 in the dry plate 14. Any conventional material can be used to form the dry plate 14, such as steel, polymers, and composite materials.

Between the wet plate 12 and dry plate 14 (and between associated diffusion media 24, 26) is disposed a membrane 28. The membrane 28 can be any conventional membrane, such as perfluorosulfonic acid (PFSA) (e.g., Nation® available from DuPont), hydrophilic polymer membranes, and polymer composite membranes, for example. For a compact fuel cell humidifier application, the membrane 28 will generally have a permeance greater than 8,000 GPU, and typically in the range of 10,000-12,000 GPU. Gas permeation unit (GPU) is a partial pressure normalized flux where 1 GPU=$10^{-6}$ cm$^3$ (STP)/(cm$^2$ sec cm Hg).

A wet side diffusion medium (or diffusion layer) 24 is disposed between one side of the membrane 28 and the wet side plate 12 (abutting the lands 18 thereof). Similarly, a dry side diffusion medium (or diffusion layer) 26 is disposed between the other side of the membrane 28 and the dry side plate 14 (abutting the lands 22 thereof). The diffusion media 24, 26 are formed from a resilient and gas permeable material such as carbon fibers.

The wet side diffusion medium 24 has to have the strength to withstand the pressure differential that the wet side paper has to support within the device design based on channel geometry and fuel cell system pressures [differential from about 20-120 kPa between the compressor outlet which is the inlet to the water vapor transfer device (WVTD) and the WVTD outlet to the system exhaust]. Carbon fiber paper (for example, TGP-H-030™ paper; Toray Industries, Inc.) is typically used for the wet side diffusion medium because of its strength and transport properties. TGP-H™ papers (Toray) and other carbon fiber papers have become widely accepted as the industry standard for fuel cell gas diffusion media due to their ability to uniformly diffuse reactant gases and transmit generated electricity. Additionally, such papers have become standard diffusion media for membrane humidifier assemblies.

Such carbon fiber papers are typically made using a wet-laid carbon fiber paper, normally containing a polyvinyl alcohol (PVA) fiber binder (for example, Kuralon® VPB fibers; Kuraray). The paper is impregnated with a phenolic resin dissolved in a solvent, such as alcohol. The impregnated paper normally has about 35% carbon fiber and 65% phenolic resin. The impregnated paper is compression molded and cured at 180° C. under pressure to cross-link the phenolic resin and to obtain the proper thickness and density. The sheets are then graphitized at temperatures above 2000° C. In the graphitization step, the phenolic resin loses about one half of its weight, which means that the final graphitized sheet is about 50% fiber and 50% binder. The PVA fiber that was in the original carbon paper is burned out in this process.

When carbon paper is used as the gas diffusion media in a fuel cell, electrical conductivity is required, necessitating the expensive graphitization step. However, electrical conductivity is not needed for use in a membrane humidifier assembly. Thus, use of conventional carbon fiber papers has an undesirable cost. Moreover, the carbon fiber paper conventionally used is stiff and brittle, resulting in increased material and manufacturing costs and difficulties.

While alternative papers may be desirable, the use of other types of papers having different thicknesses and/or strengths would require costly design changes in the channels and surface area or the volume of a conventional membrane humidifier assembly. Moreover, suitable alternative papers must have a balance of transport resistance and pressure drop that meets the performance requirements of conventionally used carbon fiber papers and conventional membrane humidifier assemblies. However, alternative papers meeting all of these requirements cannot readily be predicted by one of skill Among other things, this is because in order for effective water transport to occur (i.e. transport of water molecules from the wet side plate through the wet side diffusion media, membrane and dry side diffusion media to the dry side plate), water molecules must overcome some combination of (i) convectional mass transport resistance in the wet and dry flow channels, (ii) diffusion transport resistance through the membrane, and (iii) diffusion transport resistance through the diffusion media, and there is no known way to predict a specific material that has a suitable combination of such factors. Similarly, because pressure drop can be affected by, among other things, fiber size, fiber density, paper flexibility/rigidity, and tendency of fibers to intrude into channels of the humidifier assembly, there is no known way to predict a specific material having desirable pressure drop characteristics. Additionally, there is no known way to predict which specific material will have a suitable balance of transport resistance and pressure drop while also meeting the material strength and thickness design requirements of conventional membrane humidifier assemblies. Accordingly, there remains an unmet need in an unpredictable art for materials that can replace conventional diffusion media (particularly carbon fiber paper-based wet side diffusion media) in a conventional membrane humidifier assembly without sacrificing performance, increasing costs, or requiring substantive redesign of such assembly.

SUMMARY

In various embodiments, provided is a novel glass fiber-based paper diffusion medium, as well as a membrane humidifier for a fuel cell and method for humidifying a fuel cell using the provided glass fiber-based paper diffusion medium.

In some of the various embodiments, the provided diffusion medium is a flexible, resin-bonded glass fiber paper impregnated with 26-55% cured liquid phenolic resin and having a thickness of 100-110 μm and a Gurley permeability of at least 100 cfm.

In some of the various embodiments, the provided membrane humidifier comprises (i) a dry side diffusion medium between a membrane and a dry side plate; and (ii) a wet side diffusion medium between the membrane and a wet side plate; wherein at least the wet side diffusion medium is the provided glass fiber-based paper diffusion medium.

In some of the various embodiments, the provided method for humidifying a fuel cell comprises (i) providing a dry side diffusion medium between a membrane and a dry side plate; and (ii) providing a wet side diffusion medium between the membrane and a wet side plate; wherein at least the wet side diffusion medium is the provided glass fiber-based paper diffusion medium.

BRIEF DESCRIPTION OF THE DRAWINGS

A more complete appreciation of the invention and the many embodiments thereof will be readily obtained as the same becomes better understood by reference to the following detailed description when considered in connection with the accompanying drawings, wherein.

DETAILED DESCRIPTION

Specific embodiments of the present invention will now be described. The invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the specification and appended claims, the singular forms "a," "an," and "the" are intended to include the plural forms as well, unless the context clearly indicates otherwise.

Unless otherwise indicated, all numbers expressing quantities of ingredients, properties, conditions, and so forth as used in the specification and claims are to be understood as being modified in all instances by the term "about." Additionally, the disclosure of any ranges in the specification and claims are to be understood as including the range itself and also anything subsumed therein, as well as endpoints. Unless otherwise indicated, the numerical properties set forth in the specification and claims are approximations that may vary depending on the desired properties sought to be obtained in embodiments of the present invention. Notwithstanding that numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

In various embodiments, provided is a novel glass fiber-based paper diffusion media, as well as a membrane humidifier for a fuel cell and method for humidifying a fuel cell using the provided glass fiber-based paper diffusion media.

Diffusion Media

The provided diffusion media comprises novel glass fiber-based papers that replace carbon fiber-based papers conventionally used as diffusion media in a membrane humidifer assembly. The inventive papers have strength, thickness, porosity, pressure drop performance, and water transfer performance comparable to conventional carbon fiber-based papers and thus can be used in conventional membrane humidifier assemblies without necessitating costly design modifications. Moreover, the provided glass fiber-based papers are more flexible than conventional carbon fiber-based paper, making them easier to process in roll form. Additionally, the material costs of the provided glass fiber-based papers are reduced as compared to conventionally used carbon fiber-based papers. While the provided glass fiber papers are preferably used as wet side diffusion media in a membrane humidifier assembly, their use as dry side diffusion media is also contemplated.

Conventional glass fiber-based papers (for example, Craneglas® paper; Crane Nonwovens) were tested and found to be unsuitable for use as diffusion media in conventional membrane humidifier assemblies due to three times higher wet side pressure drops compared to baseline materials. Therefore, it was necessary to design and evaluate novel papers having numerous combinations of fiber type, binder fiber type, resin type and content, and processing conditions to develop a suitable glass fiber-based paper meeting the performance requirements of conventionally used carbon fiber-based papers (as a non-limiting example, TGP-H-030™ paper; Toray Industries, Inc.).

In light of the aforementioned, flexible, glass fiber papers impregnated with resin were developed. In some embodiments, such papers have a thickness of 100-110 µm. Accordingly, papers having a thickness of 100 µm, 101 µm, 102 µm, 103 µm, 104 µm, 105 µm, 106 µm, 107 µm, 108 µm, 109 µm, and 110 µm are specifically provided. In some embodiments, the provided glass fiber papers have a Gurley permeability of at least 100 cfm. Accordingly, papers having a Gurley permeability of 100-150 cfm, 150-200 cfm, 200-250 cfm, 250-300 cfm, and above are specifically provided. In some embodiments, the provided papers also have a porosity greater than 70%.

In various embodiments, a provided glass fiber-based paper is produced by impregnating a glass fiber paper having a basis weight (i.e., weight prior to resin impregnation and curing) of 20-50 g/m$^2$ with a resin. Accordingly, papers having a basis weight of 20-25 g/m$^2$, 25-30 g/m$^2$, 30-35 g/m$^2$, 35-40 g/m$^2$, 40-45 g/m$^2$, and 45-50 g/m$^2$ are specifically provided. Good results have been achieved using papers with a basis weight of 22 g/m$^2$ and 42 g/m$^2$. In some embodiments, the glass fiber paper used has 70-90 wt % glass fiber. Said glass fibers may, in some embodiments, have an average length of 3-6 mm, and average diameter of 7-11 µm, or both.

As indicated, the glass fiber paper is impregnated with at least one resin. The resin used may be a phenolic resin, an acrylic resins, or other suitable thermoplastic resin. A suitable resin may, in some embodiments, be one having good hot-wet performance. In some embodiments, the resin is a phenolic resin. Preferably, the phenolic resin is in liquid form. A powdered phenolic resin may also be used, but the liquid resin appears to provide enhanced performance and is easier to process (for example, the powdered resin was more difficult to distribute, and it melted and coated the drying rolls during processing). Generally, the impregnation process involves dipping the glass fiber paper into a bath containing the resin and a solvent, then removing the solvent. Methanol is one example of a suitable solvent, but other solvents are also contemplated. Removal of solvent may be by evaporation or by modification of environmental temperature or pressure. If desired, the paper can be stored in a controlled environment at this stage to prevent resin advancement, and further processed at a later time. In some embodiments, the provided glass fiber papers are impregnated with 26-55% cured liquid phenolic resin. Accordingly, papers impregnated with 26-30%, 30-35%, 35-40%, 40-45%, and 45-50% resin are specifically provided. In some embodiments, the low resin content results in a discontinuous film of cured resin, thereby permitting good air and water permeability.

In addition to glass fibers and resin, the provided (uncured) papers may also comprise one or more types of fiber binders that will, upon curing, be at least partially removed or undergo at least a partial phase change (i.e., be "burned out"). In some embodiments, up to 10 wt % (prior to curing) of the basis paper may comprise a fiber binder. Accordingly, papers comprising 0-2%, 2-4%, 4-6%, 6-8%, and 8-10% fiber binder are specifically contemplated. Polyvinyl alcohol (PVA)-based fiber binders (for example, Kuraion® fibers) are suitable, but other fiber binders may also be used. For example, selection of alternative fiber binders may be desirable to improve roll processing capability. PVA fibers typically contain sodium or other salt, which may have a negative effect on water vapor transfer performance. Moreover, salt may leach through the final paper and cause damage to the membrane of the humidifier. Therefore, in processing, salt should be washed out in the papermaking process. If necessary, a cleaning step of the intermediate product or the finished paper could be added to the process to remove any residual sodium.

In some embodiments, in addition to glass fibers, other fiber types may also be used in the base paper to reduce the use of fiber binder and resin. Up to 20 wt % of the paper may comprise such other fibers, in some embodiments. Accordingly, papers having 0-5%, 5-10%, 10-15%, and 15-20% of such fibers are specifically provided. Examples of suitable fibers include acrylic, polyester, nylon, ceramic, polyether ketone (PEK), polyether ether ketone (PEEK), liquid crystal polymer (for example, Vectran® fiber; Kuraray Co.), or other hydrophobic fibers that are, or can be made water dispersible, with proper finish. In some embodiments, acrylic fibers may be used in addition to glass fibers to reduce the use of PVA binder and resin. Examples of suitable acrylic fibers include polyacrylonitrile (PAN) fibers, fibrillated acrylic fibers (for example, CFF® fiber; Sterling Fibers), and nanofibrillated acrylic fibers (for example, EFTec™ fiber; Engineered Fibers Technology). Good results have been obtained with sheets made with up to 10% CFF® fibrillated fiber or EFTec™ nanofibrillated fiber.

Using conditions well known to those versed in the art, the resulting resin impregnated glass fiber paper is cured using heat and pressure. For example, papers may be compression molded and cured with a pressure of 20-200 psi and temperature of 180° C. Additionally, molding may be continuos or discontinous.

In some of the various embodiments, a cured and molded resin-bonded glass fiber paper suitable for use as wet side diffusion medium comprises 70-90 wt % glass fiber, has a thickness of 100-110 μm, has a Gurley permeability of at least 100 cfm (alternatively, at least 200 cfm), and is impregnated with 25-55% cured liquid phenolic resin. Such paper may have a basis weight of 20-50 g/m² prior to impregnation with and curing of the liquid phenolic resin. For example, a suitable glass fiber paper may have a basis weight of 40-44 g/m² and a cured resin content of 26-40%. As another example, a suitable glass fiber paper may have a basis weight of 20-24 g/m² and a cured resin content of 35-55%.

Membrane Humidifier

In some of the various embodiments, provided is a membrane humidifier that uses the provided glass fiber-based paper diffusion media. Such membrane humidifier comprises (i) a dry side diffusion medium between a membrane and a dry side plate; and (ii) a wet side diffusion medium between the membrane and a wet side plate; wherein at least the wet side diffusion medium is the provided glass fiber-based paper diffusion medium. More particularly, a provided membrane humidifier comprises (i) a membrane; (ii) a wet side plate and a dry side plate on opposite sides of the membrane, the wet side plate and dry side plate having flow channels therein; (iii) a dry side diffusion medium between the membrane and the dry side plate; and (iv) a flexible, resin-bonded glass fiber paper wet side diffusion medium between the membrane and the wet side plate, the glass fiber paper comprising (a) glass fiber, (b) a thickness of 100-110 μm, and (c) a Gurley permeability of at least 100 cfm; wherein the paper is impregnated with 26-55% cured liquid phenolic resin. In some embodiments, the dry side diffusion medium may also be the provided glass fiber-based paper diffusion media. In some embodiments, the provided membrane humidifier is a conventionally used membrane humidifier, with the exception that the conventional wet side diffusion media, dry side diffusion media, or both have been replaced with the provided glass fiber-based paper diffusion media.

Method for Humidifying a Fuel Cell

In some of the various embodiments, provided is a method for humidifying a fuel cell using the provided glass fiber-based paper diffusion media. Such method comprises (i) providing a dry side diffusion medium between a membrane and a dry side plate; and (ii) providing a wet side diffusion medium between the membrane and a wet side plate; wherein at least the wet side diffusion medium is the provided glass fiber-based paper diffusion medium. More particularly, a provided method for humidifying a fuel cell comprises: (i) providing a membrane humidifier comprising a membrane; a wet side plate and a dry side plate on opposite sides of the membrane, the wet side plate and dry side plate having flow channels therein; (ii) providing a dry side diffusion medium between the membrane and the dry side plate; (iii) providing a flexible, resin-bonded glass fiber paper wet side diffusion medium between the membrane and the wet side plate, the glass fiber paper comprising (a) glass fiber, (b) a thickness of 100-110 μm, and (c) a Gurley permeability of at least 100 cfm; wherein the paper is impregnated with 26-55% cured liquid phenolic resin; (iv) introducing a wet gas into the flow channels on the wet side of the plate; (v) introducing a dry gas into the flow channels of the dry side of the plate, water vapor from the wet side gas flowing through the membrane into the dry side gas; and (vi) providing the dry side gas with the water vapor to a feed for the fuel cell. In some embodiments, the provided method further comprises providing a dry side diffusion medium that comprises the provided glass fiber-based paper diffusion media.

EXAMPLES

The described embodiments will be better understood by reference to the following examples which are offered by way of illustration and which one of skill in the art will recognize are not meant to be limiting.

Example 1

A base paper was made of 7 micron glass fiber and a PVA binder (salt-free type) with a basis weight of about 50 g/m². The glass fiber paper was impregnated with phenolic resin using both liquid and powder resin to obtain about 35% resin content. Handsheet papers were compression molded and cured under 200 psi or less pressure at 180° C. Formulations and properties of the resulting glass-fiber handsheet papers are shown in Table 1. The powder phenolic resin of sample -11B was not as effective as the liquid resin of sample -38B. The powder resin performs best when used in conjunction with fibrillated fibers, and the use of thru-air or other non-contacting dryers are required in production. However, use of powder resin eliminates the need for a separate resin impregnation step.

TABLE 1

| Sample | Thickness (μm) | Resin Type | Resin Pickup (%) | Fiber Length (mm) | Glass (%) | CFF 114-3 (%) | PVA (%) | Final Weight (g) | Density (g/cc) |
|---|---|---|---|---|---|---|---|---|---|
| 11B | 111.4 | PSR-122 | | | | | | | |
| 16C | 110 | | | | | | | | |
| 16B | 104 | | | | | | | | |
| 16G | 84.6 | | | | | | | | |
| 17A | 122 | | | | | | | | |
| 17B | 106 | | | | | | | | |
| 17C | 135 | | | | | | | | |
| 38B | 136 | | | | | | | | |
| T030 | 110.4 | | | | | | n/a | | |

Figure 2:
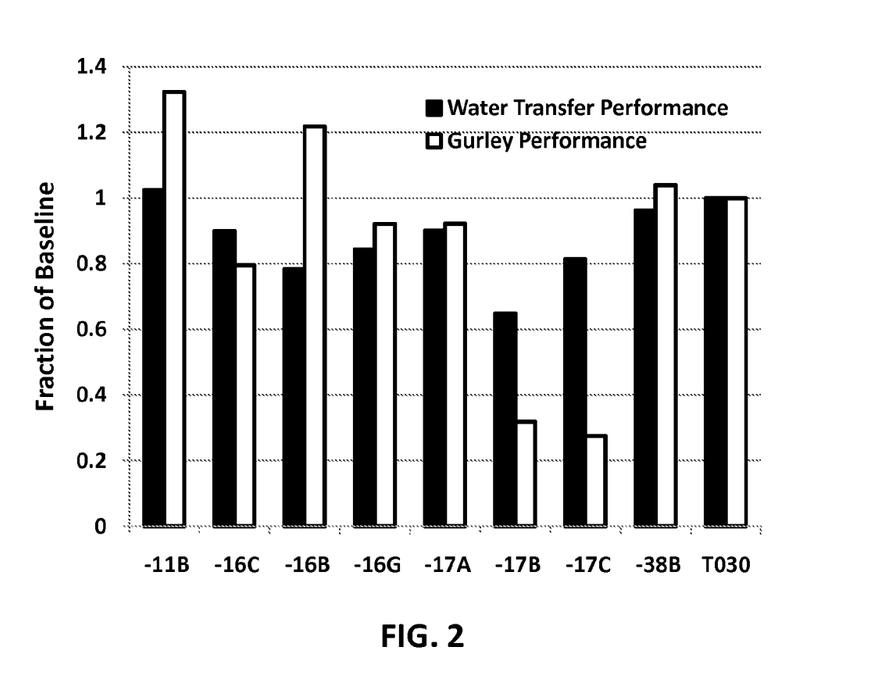
FIG. 2 is a graph comparing the water transfer performance and Gurley performance of different glass fiber based paper formulations.

The water vapor transfer and Gurley performance of these papers are shown in FIG. 2. The water vapor transfer performance is measured using a 50 cm$^2$ membrane area and straight flowfields with a similar geometry to that shown in U.S. Pat. No. 7,875,396, counter flow, with a dry side flow of 11.5 slpm, 80 C, 183 kPaa, and wet side flow of 10 slpm, 80 C, 85% relative humidity, and 160 kPa.

As can be seen, several papers (including -11B, -17A, and 38B) performed comparably to the conventional carbon fiber-based paper (TGP-H-030™ paper; Toray Industries, Inc.).

Example 2

Figure 3:
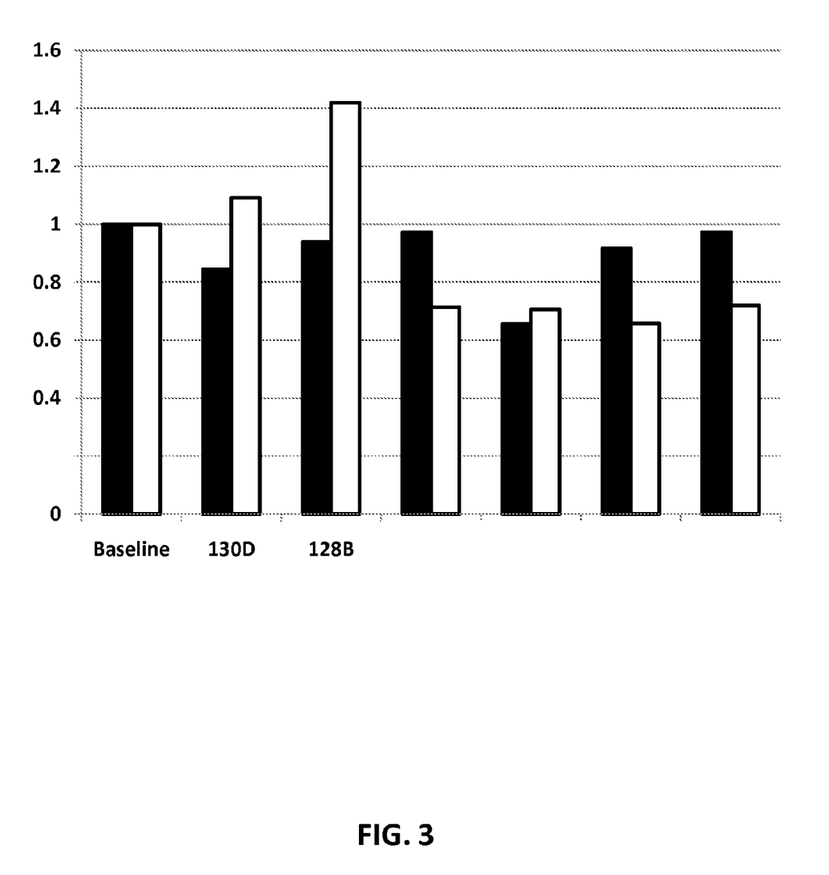
FIG. 3 is a graph comparing the water transfer performance and Gurley performance of different glass fiber based paper formulations.

A series of papers were made with varying the fiber type, percent glass fiber, and percent PVA using the general procedures described in Example 1. Several samples containing 10% CFF fibers, various types of glass, and a Gurley performance of approximately 100 cfm were chosen for water transfer permeability testing. These samples are shown in Table 2. The glass fibers used were obtained from Owens Corning, Nippon, and Lauscha. The water transfer performance is shown in FIG. 3, where several (including -128B, -106B, and -131A) are within 10% of the baseline (TGP-H-030™ paper; Toray Industries, Inc.) in water transfer performance.

baseline/control sheets (100 µm TGP-H-030™ paper; Toray Industries, Inc) because of the low resin content. The flexibility increased both with lower resin content and lower basis weight.

Figure 4:
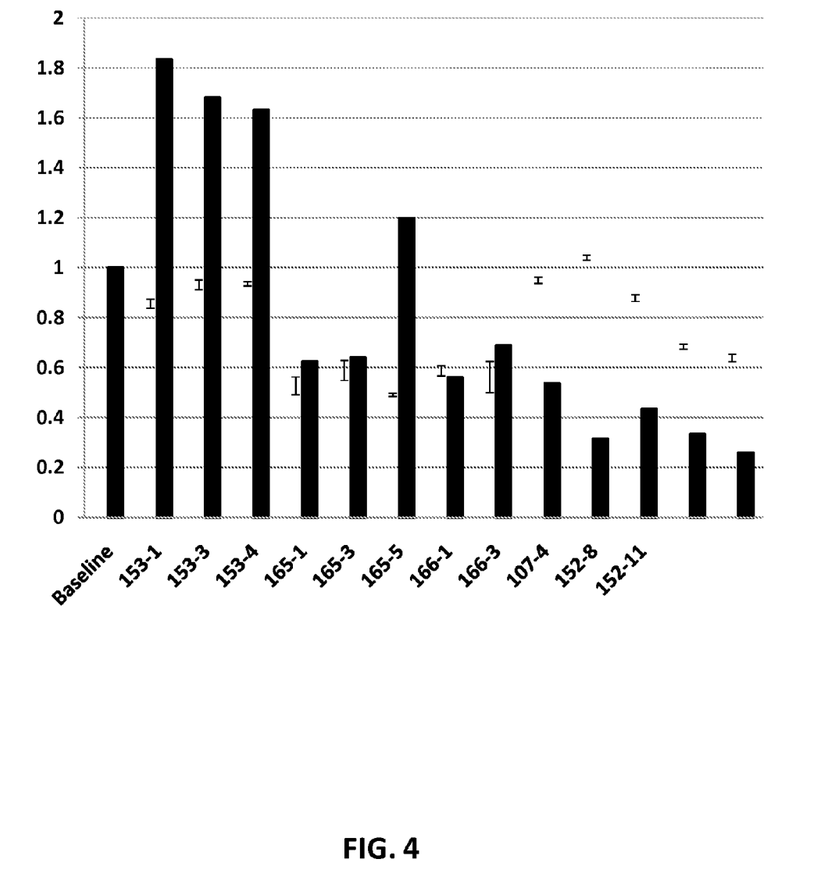
FIG. 4 is a graph comparing the water transfer performance and Gurley performance of different glass fiber based paper formulations.

The air permeabilities and paper properties are shown in Table 4 and FIG. 4. As can be observed therein, the Gurley air permeability of several samples is equal to or greater than that of the baseline/control sheet.

TABLE 4

Physical Properties of Glass Papers

| Sample | Resin Content (%) | Basis Weight (g/m$^2$) | Thickness (mils) | Density (g/cm$^3$) | Gurley Permeability (csm) |
|---|---|---|---|---|---|
| 153-1 | 32.9 | 76 | 6.3 | 0.474 | 262 |
| 153-2 | 34.3 | 79 | 6.5 | 0.477 | 276 |
| 153-3 | 34.1 | 78 | 4.8 | 0.641 | 240 |
| 153-4 | 33.7 | 78 | 4.8 | 0.641 | 233 |
| 153-5 | 34.0 | 81 | 5.0 | 0.641 | 233 |
| Control | 37.8 | 80 | 6.5 | 0.485 | 203 |

TABLE 2

| Sample | Resin Type | Resin Pickup (%) | Fiber Length (mm) | Glass Fiber Diameter (µm) | Glass (%) | CFF 114-3 (%) | PVA (%) | Final Weight (g) | Thickness (mils) | Density (g/cc) | Gurley (cfm) |
|---|---|---|---|---|---|---|---|---|---|---|---|
| 130D | PSR-133 | 38 | 6 | 11 | 85 | 10 | 5 | 4.76 | 6.1 | 0.5 | 156 |
| 128B | PSR-133 | 37.8 | 6 | 11 | 90 | 10 | 0 | 4.92 | 6.5 | 0.485 | 203 |
| 106B | 13637 | 32.8 | 3 | 7 | 90 | 10 | 0 | 4.67 | 6.5 | 0.461 | 102 |
| 126C | PSR-133 | 36.6 | 6 | | 80 | 10 | 10 | 4.98 | 6.4 | 0.499 | 101 |
| 128A | PSR-133 | 37.6 | 3 | 11 | 90 | 10 | 0 | 4.97 | 6.8 | 0.468 | 94 |
| 131A | PSR-133 | 18.4 | 3 | 11 | 85 | 10 | 5 | 3.95 | 6.1 | 0.415 | 103 |

Example 3

Rolls of one (1) meter wide and 100 meters length commercially available 50 g/m$^2$ glass fiber paper having 90 wt % 11 µm diameter and 12 mm length glass fibers, and 10% PVA fiber binder (Kurolon® VPB 105-2 type) were obtained from Technical Fibre Products (TFP). Such paper was impregnated with phenolic resin (PSR133, available from Lewcott Corp. of Millbury, Mass.) at levels of 35% and 44% resin. The glass fiber paper was then dipped into a methanol/phenolic resin bath, and the methanol was then evaporated. The impregnated/uncured papers had no tack and were cut into sheets or rolled onto three-six inch cores for additional processing.

Sheets were molded from the impregnated glass fiber paper. The sheets were very uniform in appearance. The glass fiber sheets were more flexible than the carbon fiber paper A 100 foot roll of one (1) meter wide 50 g/m$^2$ glass paper (described above) was saturated with phenolic resin diluted with isopropanol. The impregnated, dried roll was cut into eighteen inch by one meter sheets for molding on a production compression press. Sample sheets (9¾×9¾ inch) were molded under several conditions. The results are shown in Table 5 and FIG. 4. B-staging for 30 minutes produced sheets with close to the same Gurley air permeability as in Example 2, but at higher thickness. Shorter B-staging resulted in sheets with air flows less than one hundred Gurley permeability (CSM), leading to low water vapor transfer. Permeability values were significantly lower than the laboratory saturated papers from Table 4.

TABLE 5

Initial Production Saturated Grade

| Sample | B-Stage Time (Min) | B-Stage Temp. (° C.) | Resin Pickup (%) | Weight, Final (g) | Basis Weight Final (g/m2) | Thickness Final (mils) | Density Final (g/cc) | Gurley Permeability Final (csm) |
|---|---|---|---|---|---|---|---|---|
| 165-1 | 10 | 80 | 47 | 4.31 | 70 | 5.6 | 0.493 | 89.1 |
| 165-2 | 10 | 80 | 47 | 4.19 | 68 | 5.2 | 0.516 | 85.5 |
| 165-3 | 10 | 100 | 47 | 4.20 | 68 | 5.9 | 0.456 | 91.3 |

TABLE 5-continued

Initial Production Saturated Grade

| Sample | B-Stage Time (Min) | B-Stage Temp. (° C.) | Resin Pickup (%) | Weight, Final (g) | Basis Weight Final (g/m2) | Thickness Final (mils) | Density Final (g/cc) | Gurley Permeability Final (csm) |
|---|---|---|---|---|---|---|---|---|
| 165-4 | 10 | 100 | 47 | 4.28 | 70 | 6.0 | 0.457 | 93.1 |
| 165-5 | 30 | 100 | 47 | 4.35 | 71 | 7.7 | 0.362 | 171.1 |
| 165-6 | 30 | 100 | 47 | 4.31 | 70 | 7.0 | 0.395 | 139.9 |
| 166-1 | 50 | 100 | 47 | 4.20 | 68 | 6.4 | 0.421 | 80.0 |
| 166-2 | 50 | 100 | 47 | 4.14 | 67 | 6.1 | 0.435 | 82.4 |
| 166-3 | 0 | 0 | 47 | 4.34 | 71 | 5.3 | 0.525 | 98.4 |
| 166-4 | 0 | 0 | 47 | 4.14 | 67 | 5.1 | 0.520 | 98.4 |

Example 4

Figure 5:
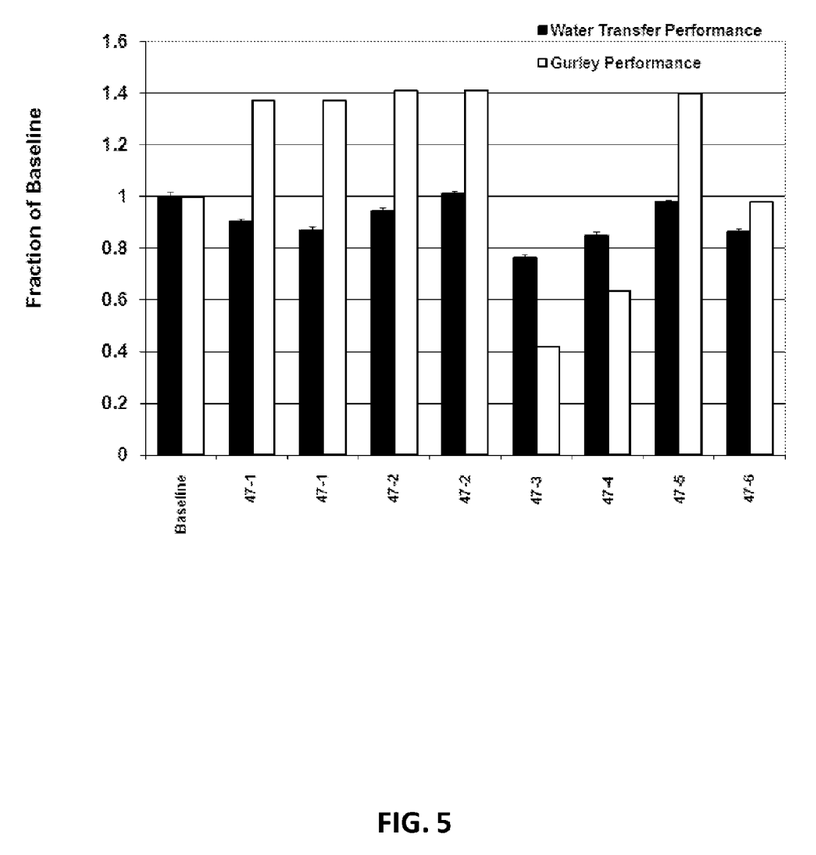
FIG. 5 is a graph comparing the water transfer performance and Gurley performance of glass fiber based paper formulations using different glass fibers.

The effect of use of different binder fibers in glass fiber paper was evaluated. The samples were made using the process described in Example 3. The resulting formulations are shown in Table 6, and the water transfer and Gurley performance results are shown in FIG. 5.

TABLE 6

Alternate Binder Fibers

| Sample | Paper Basis Weight (g/m$^2$) | Binder Fiber | Resin Content (%) | Weight, (g)* | Basis Weight (g/m$^2$) | Thickness (μm) | Thickness (mils) | Density (g/cm$^3$) | Gurley Porosity (CFM) |
|---|---|---|---|---|---|---|---|---|---|
| 47-1 | 50 | N720F Polyester | 33.6 | 4.4 | 71.6 | 116 | 4.6 | 0.617 | 196.0 |
| 47-2 | 50 | VPB 105-2 PVA | 33.2 | 4.2 | 68.1 | 118 | 4.7 | 0.577 | 202.0 |
| 47-3 | 50 | EFTec A-010-4 | 33.3 | 4.2 | 67.6 | 114 | 4.5 | 0.593 | 60.0 |
| 47-4 | 50 | EFTec A-040-6 | 33.0 | 4.8 | 78.2 | 119 | 4.7 | 0.657 | 91.0 |
| 47-5 | 50 | MFH 18-2 PVA | 33.8 | 4.4 | 71.2 | 126 | 5.0 | 0.565 | 200.0 |
| 47-6 | 50 | VPB 101 PVA | 34.1 | 4.9 | 80.5 | 118 | 4.7 | 0.682 | 140.0 |

Example 5

Figure 6:
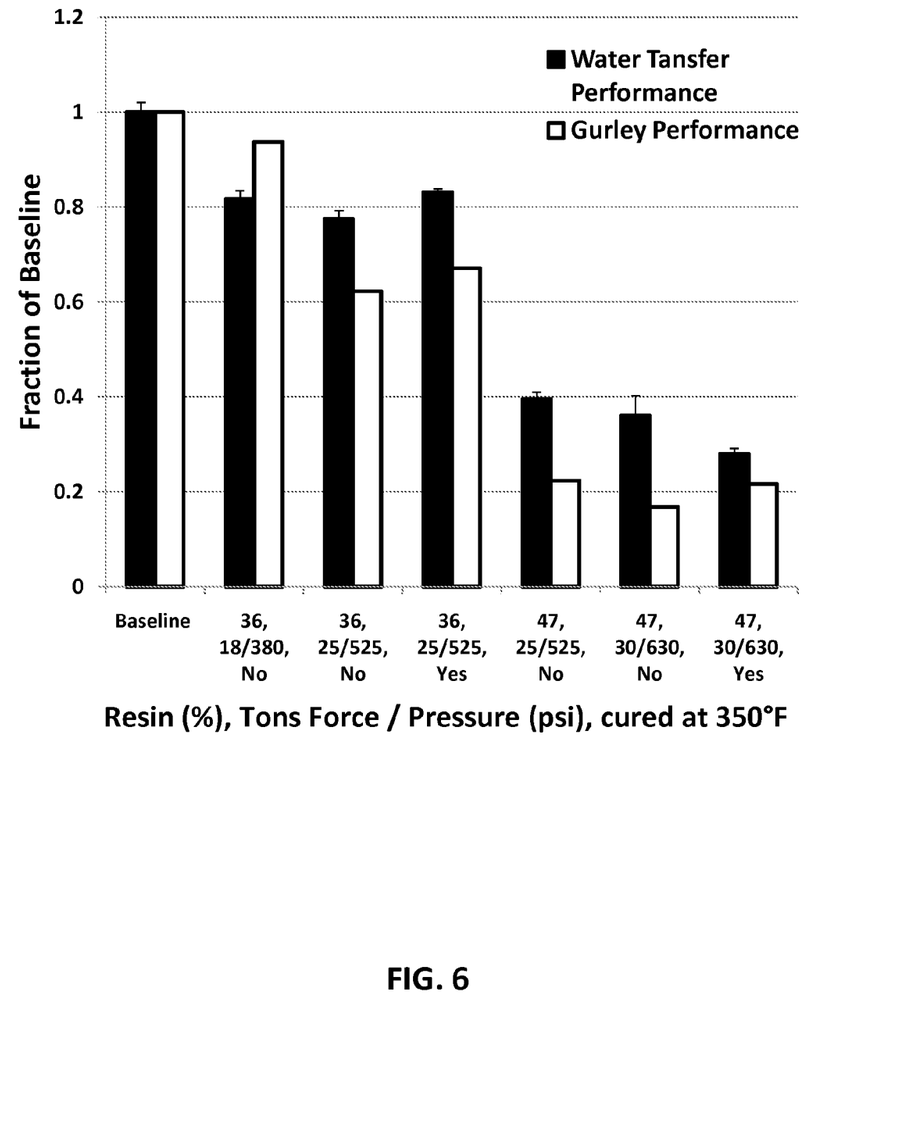
FIG. 6 is a graph comparing the water transfer performance and Gurley performance of glass fiber based paper formulations under different molding conditions.

The effect of molding conditions was evaluated. The molding pressure, and curing conditions were varied. It was found that the resin content (36% vs. 47%) had a greater effect than the molding conditions. Hand sheet data for 50 g/m$^2$ paper are presented in Table 7 and FIG. 6A.

TABLE 7

Hand Sheet results for molding conditions

| Sample | Resin Content (%) | Sheet Compressed @ Tons Force/Psi | Cure at 350° F., Contact Pressure | Weight (g) | Basis Weight (g/m$^2$) | Thickness (μm) | Thickness (mils) | Density (g/cm$^3$) | Gurley Porosity (CFM) |
|---|---|---|---|---|---|---|---|---|---|
| 108-1 | 36 | 18/380 | No | 4.82 | 78.6 | 138 | 5.5 | 0.569 | 140 |
| 108-2 | 36 | 18/380 | No | 4.82 | 78.6 | 128 | 5.1 | 0.614 | 134 |
| 108-3 | 36 | 18/380 | No | 4.83 | 78.7 | 125 | 5.0 | 0.630 | 129 |
| 108-4 | 36 | 25/525 | No | 4.8 | 77.4 | 121 | 4.8 | 0.640 | 89 |
| 108-5 | 36 | 25/525 | No | 4.7 | 75.8 | 117 | 4.6 | 0.648 | 90 |
| 108-6 | 36 | 25/525 | No | 4.7 | 76.1 | 110 | 4.4 | 0.692 | 83 |
| 108-16 | 36 | 25/525 | Yes | 4.69 | 76.4 | 128 | 5.1 | 0.597 | 96 |
| 108-17 | 36 | 25/525 | Yes | 4.60 | 75.0 | 123 | 4.9 | 0.610 | 96 |
| 108-18 | 36 | 25/525 | Yes | 4.64 | 75.6 | 114 | 4.5 | 0.663 | 94 |
| 108-7 | 47 | 25/525 | No | 6.39 | 104.2 | 119 | 4.7 | 0.875 | 25 |
| 108-8 | 47 | 25/525 | No | 6.45 | 105.1 | 128 | 5.1 | 0.821 | 36 |
| 108-9 | 47 | 25/525 | No | 6.42 | 104.6 | 122 | 4.8 | 0.858 | 32 |

TABLE 7-continued

Hand Sheet results for molding conditions

| Sample | Resin Content (%) | Sheet Compressed @ Tons Force/Psi | Cure at 350° F., Contact Pressure | Weight (g) | Basis Weight (g/m²) | Thickness (µm) | Thickness (mils) | Density (g/cm³) | Gurley Porosity (CFM) |
|---|---|---|---|---|---|---|---|---|---|
| 108-10 | 47 | 30/630 | No | 6.5 | 106.1 | 122 | 4.8 | 0.870 | 18 |
| 108-11 | 47 | 30/630 | No | 6.6 | 107.4 | 123 | 4.9 | 0.873 | 27 |
| 108-12 | 47 | 30/630 | No | 6.4 | 104.8 | 118 | 4.7 | 0.888 | 24 |
| 108-13 | 47 | 30/630 | Yes | 6.36 | 103.7 | 134 | 5.3 | 0.774 | 40 |
| 108-14 | 47 | 30/630 | Yes | 6.45 | 105.1 | 139 | 5.5 | 0.756 | 31 |
| 108-15 | 47 | 30/630 | Yes | 6.55 | 106.8 | 139 | 5.5 | 0.768 | 32 |

A one hundred meter roll of the 50 g/m² glass paper (described above) was saturated with phenolic resin diluted in methanol. The resin content at the targeted nominal 35% and 47% was obtained. The roll was cut into eighteen inch by one meter sheets as above.

The sheets were stacked, separated by mold release papers, and molded in a production molding press using a molding cycle of 30 minutes at 350° F. (180° C.). The number of sheets per stack was varied to determine the correct conditions for obtaining the target thickness. Results for these sheets are shown in Table 8.

TABLE 8

Production Resin Saturation/Molding of WVDT Glass Sheets

| Sheet | Resin Content (%) | Sheets/Stack | Weight (g) | Basis Weight (g/m²) | Thickness (mm) | Thickness (mils) | Density (g/cm³) | Gurley Porosity (CFM) | Gurley Reading |
|---|---|---|---|---|---|---|---|---|---|
| 02R | 36 | 31/29 | 6.20 | 79.4 | 0.143 | 5.7 | 0.556 | 224.3 | 1007 |
| 02M | 36 | 31/29 | 6.05 | 77.4 | 0.139 | 5.5 | 0.556 | 230.9 | 1037 |
| 02L | 36 | 31/29 | 6.14 | 78.6 | 0.147 | 5.8 | 0.536 | 255.2 | 1146 |
| 15R | 36 | 31/29 | 5.92 | 75.8 | 0.148 | 5.8 | 0.514 | 223.6 | 1004 |
| 15M | 36 | 31/29 | 5.98 | 76.5 | 0.148 | 5.8 | 0.519 | 233.4 | 1048 |
| 15L | 36 | 31/29 | 5.75 | 73.6 | 0.148 | 5.9 | 0.496 | 255.9 | 1149 |
| 28R | 36 | 31/29 | 6.07 | 77.7 | 0.147 | 5.8 | 0.529 | 197.3 | 886 |
| 28M | 36 | 31/29 | 6.05 | 77.4 | 0.147 | 5.8 | 0.528 | 197.3 | 886 |
| 28L | 36 | 31/29 | 6.17 | 79.0 | 0.149 | 5.9 | 0.529 | 264.3 | 1187 |
| | | AVG | | 77.3 | 0.146 | 5.8 | 0.529 | 231.4 | |
| 02R | 36 | 29/28 | 5.72 | 73.2 | 0.135 | 5.4 | 0.541 | 186.4 | 837 |
| 02M | 36 | 29/28 | 5.92 | 75.8 | 0.125 | 5.0 | 0.605 | 141.6 | 636 |
| 02L | 36 | 29/28 | 6.34 | 81.2 | 0.139 | 5.5 | 0.585 | 208.4 | 936 |
| 15R | 36 | 29/28 | 6.06 | 77.6 | 0.135 | 5.4 | 0.574 | 191.7 | 861 |
| 15M | 36 | 29/28 | 6.20 | 79.4 | 0.129 | 5.1 | 0.614 | 184.6 | 829 |
| 15L | 36 | 29/28 | 5.89 | 75.4 | 0.143 | 5.6 | 0.529 | 253.0 | 1136 |
| 27R | 36 | 29/28 | 5.86 | 75.0 | 0.130 | 5.2 | 0.577 | 174.4 | 783 |
| 27M | 36 | 29/28 | 5.73 | 73.3 | 0.124 | 4.9 | 0.590 | 168.8 | 758 |
| 27L | 36 | 29/28 | 5.84 | 74.8 | 0.133 | 5.3 | 0.561 | 244.5 | 1098 |
| | | AVG | | 76.2 | 0.133 | 5.3 | 0.575 | 194.8 | |
| 02R | 47 | 29/30 | 7.90 | 101.1 | 0.160 | 6.3 | 0.632 | 155.4 | 698 |
| 02M | 47 | 29/30 | 7.89 | 101.0 | 0.165 | 6.6 | 0.611 | 162.3 | 729 |
| 02L | 47 | 29/30 | 7.91 | 101.2 | 0.142 | 5.6 | 0.713 | 112.0 | 503 |
| 15R | 47 | 29/30 | 7.96 | 101.9 | 0.159 | 6.3 | 0.641 | 151.0 | 678 |
| 15M | 47 | 29/30 | 7.89 | 101.0 | 0.155 | 6.1 | 0.652 | 128.7 | 578 |
| 15L | 47 | 29/30 | 8.16 | 104.4 | 0.151 | 6.0 | 0.693 | 114.0 | 512 |
| 28R | 47 | 29/30 | 7.98 | 102.1 | 0.152 | 6.0 | 0.671 | 146.5 | 658 |
| 28M | 47 | 29/30 | 8.08 | 103.4 | 0.145 | 5.7 | 0.713 | 115.6 | 519 |
| 28L | 47 | 29/30 | 8.10 | 103.7 | 0.157 | 6.2 | 0.660 | 126.7 | 569 |
| | | AVG | | 102.2 | 0.154 | 6.1 | 0.665 | 134.7 | |

Example 6

Figure 7:
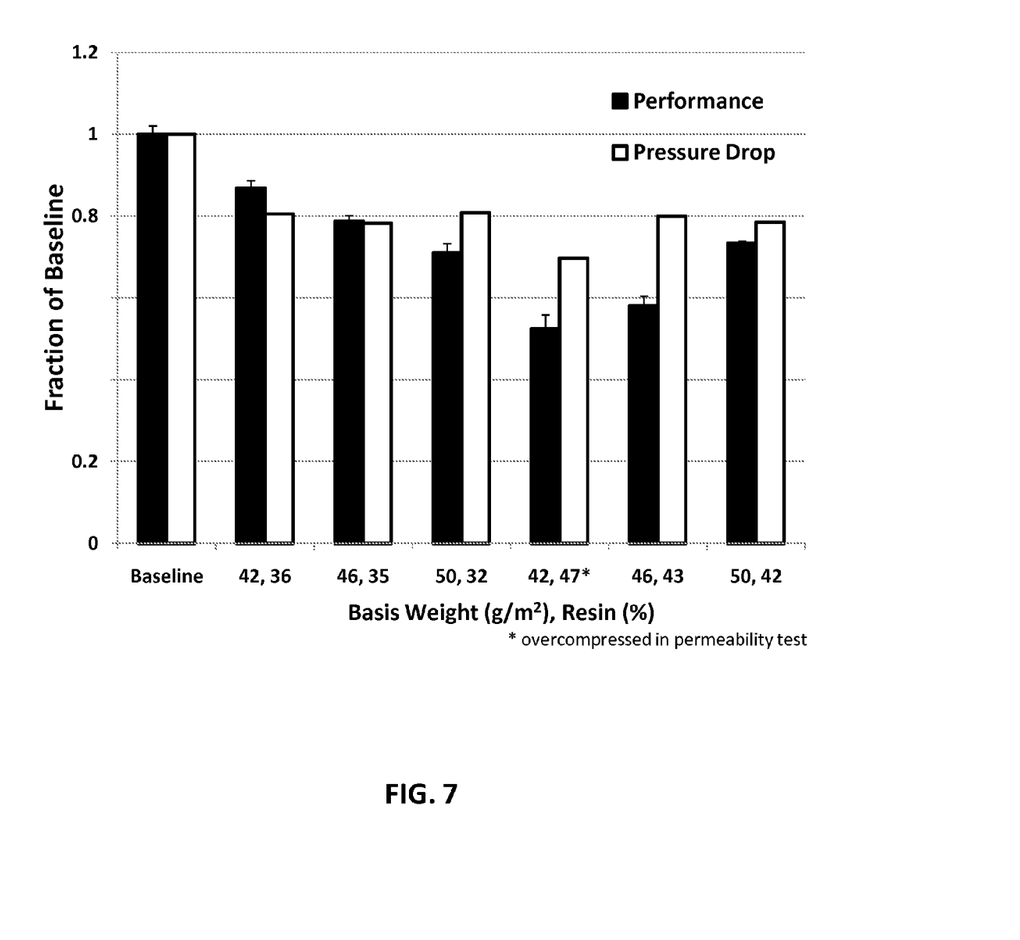
FIG. 7 is a graph comparing the water transfer performance and pressure drop of glass fiber based paper formulations having different basis weights and resin content.

The effect of paper basis weight was studied on hand sheets prepared as described in Example 1 having a basis weight of 42-50 g/m² and resin content of 36-47 wt %. The results are shown in FIG. 7. It was found that performance increases with a decrease in resin content. Performance also increases with a decrease in the basis weight of the paper. Additionally, it was observed that pressure drop was lower for all samples as compared to the baseline material, suggesting that the sample papers were at least as strong as the baseline material, if not stronger.

Example 7

Figure 8:
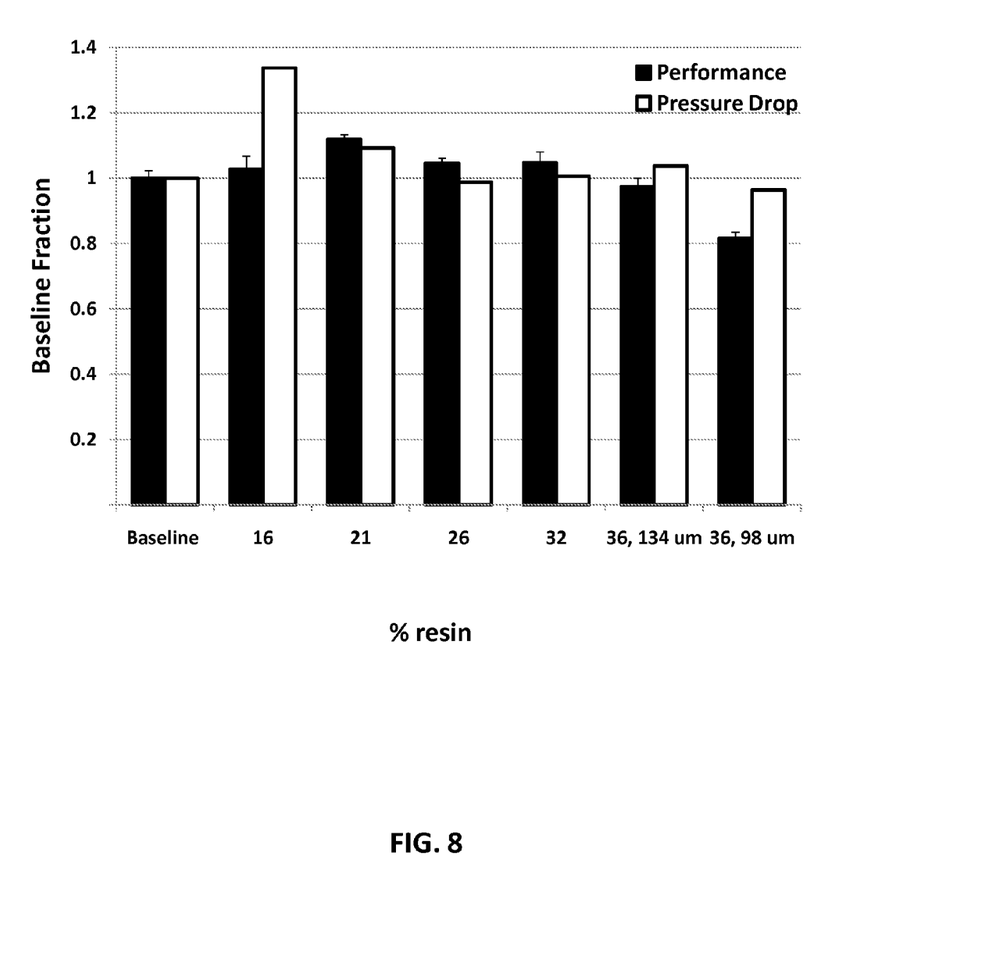
FIG. 8 is a graph comparing the water transfer performance and pressure drop of glass fiber based paper formulations having different resin content at 42 g/m$^2$ basis weight.

The effect of resin level was evaluated using 42 g/m² basis weight papers having a resin content of 16-36 wt %, said papers prepared as described in Example 1. The results are shown in FIG. 8. It was found that performance increases with a decrease in resin content. However, strength also decreases as the resin content decreases. For example, the two samples with the lowest resin content (16% and 21%) showed an increase in pressure drop, suggesting a decrease in strength. It was also found that decreasing the thickness of the paper while maintaining the same resin content decreases performance, as illustrated in the far right samples in FIG. 8.

Example 8

Figure 9:
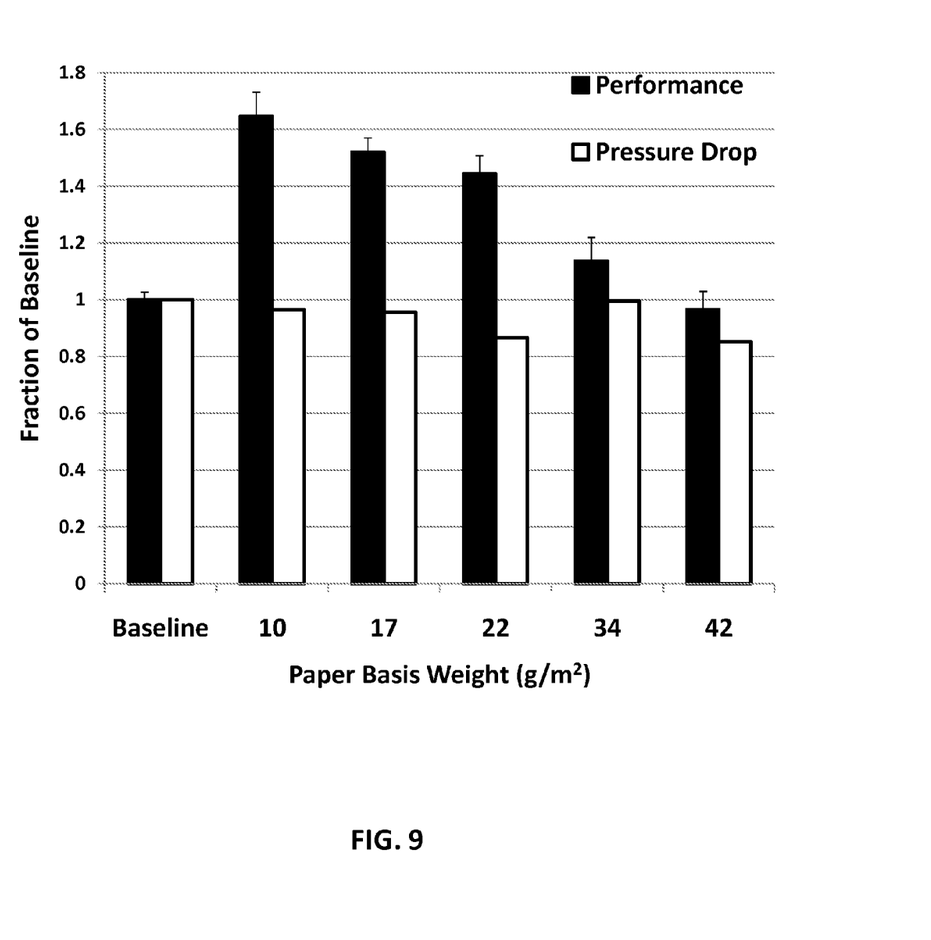
FIG. 9 is a graph comparing the water transfer performance and pressure drop of glass fiber based paper formulations having different basis weights at 35% resin content.

The effect of glass paper basis weight was studied on hand sheets prepared as described in Example 1, said sheets having a basis weight of 10-42 g/m² and a resin content of 35 wt % (+/−3%). FIG. 9 shows the results. It was found that performance increases with a decrease in basis weight of the paper. However, although pressure drop for each sheet was within 10% of the baseline material, it was found that strength also decreases as the basis weight is decreased.

Example 9

Figure 10:
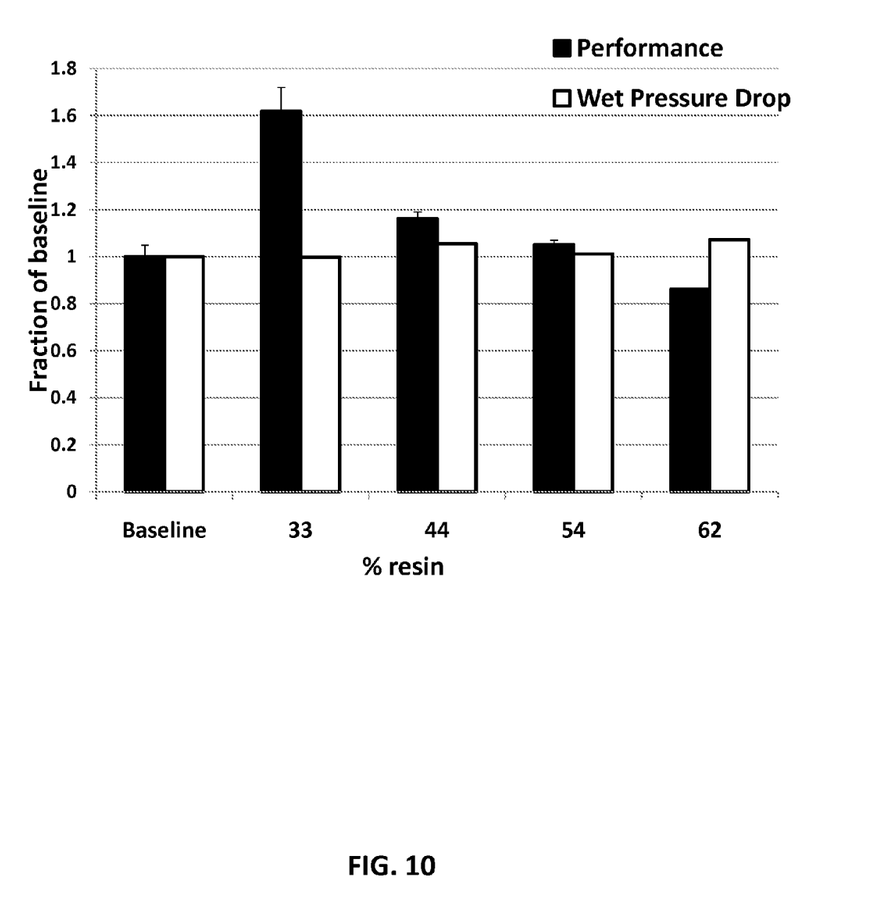
FIG. 10 is a graph comparing the water transfer performance and pressure drop of glass fiber based paper formulations having different resin content at 22 g/m$^2$ basis weight.

The effect of resin level was studied on hand sheets prepared as described in Example 1, said sheets having a 22 g/m² basis weight and a resin content of 33-62 wt %. The results are shown in FIG. 10. It was found that performance generally increases with a decrease in resin content. However, it was also found that strength generally decreases as the resin content is decreased.

Example 10

Figure 11:
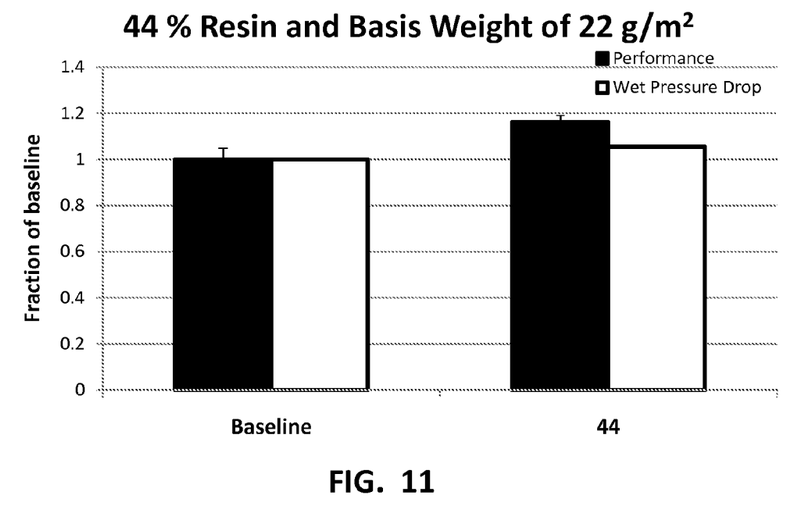
FIG. 11 is a graph comparing the performance of a glass fiber paper having a basis weight of 22 g/m$^2$ and a phenolic resin content of 44% with conventional carbon fiber paper.
Figure 12:
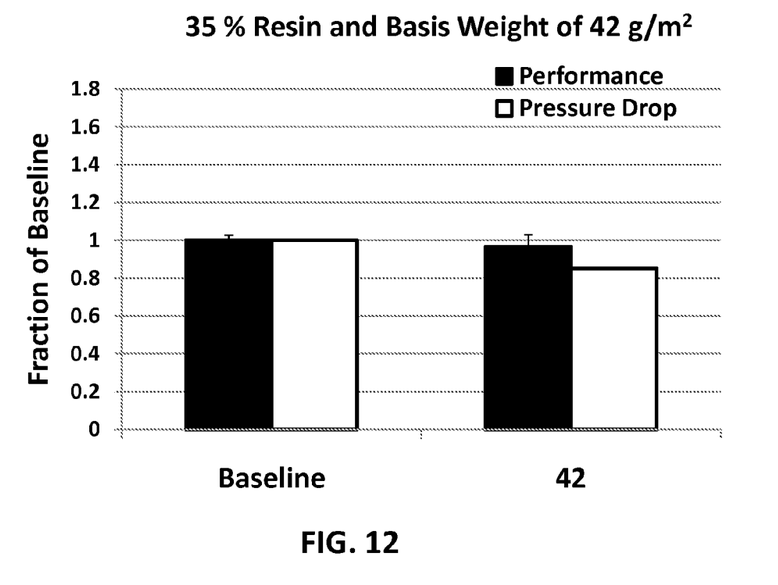
FIG. 12 is a graph comparing the performance of a glass fiber paper having a basis weight of 42 g/m$^2$ and a phenolic resin content of 35% with conventional carbon fiber paper.

Of all of the papers prepared and described herein, it was determined that two in particular are especially suitable for replacing carbon fiber-based paper as wet side diffusion media in a membrane humidifier assembly. A glass fiber paper having a basis weight of 22 g/m² and a phenolic resin content of 44% is one of the exemplary papers. This paper is described in Example 9 and FIG. 10. A comparison of the performance of such paper and a conventional carbon fiber paper (TGP-H-030™ paper; Toray Industries, Inc) is shown in FIG. 11. The other exemplary paper is a glass fiber paper having a basis weight of 42 g/m² and 35% phenolic resin content. This paper is described in Example 8 and FIG. 9. A comparison of the performance of such paper and a conventional carbon fiber paper (TGP-H-030™ paper; Toray Industries, Inc) is shown in FIG. 12.

This application should not be considered limited to the specific examples described herein, but rather should be understood to cover all aspects of the invention. Various modifications, equivalent processes, as well as numerous structures and devices to which the present invention may be applicable will be readily apparent to those of skill in the art. Those skilled in the art will understand that various changes may be made without departing from the scope of the invention, which is not to be considered limited to what is described in the specification.

What is claimed is:

1. A membrane humidifier for a fuel cell, comprising:
   (i) a membrane;
   (ii) a wet side plate and a dry side plate on opposite sides of the membrane, the wet side plate and dry side plate having flow channels therein;
   (iii) a dry side diffusion medium between the membrane and the dry side plate; and
   (iv) a flexible, resin-bonded glass fiber paper wet side diffusion medium between the membrane and the wet side plate, the glass fiber paper comprising (a) glass fiber, (b) a thickness of 100-110 μm, and (c) a Gurley permeability of at least 100 cfm;
   wherein the glass fiber paper of the wet side diffusion medium is impregnated with 26-55% cured liquid phenolic resin.

2. The membrane humidifier of claim 1, wherein the glass fiber paper comprises 70-90 wt % glass fiber.

3. The membrane humidifier of claim 2, wherein the glass fiber paper comprises up to 20 wt % fibrillated or nanofibrillated acrylic fiber.

4. The membrane humidifier of claim 1, wherein the dry side diffusion medium is a flexible, resin-bonded glass fiber paper comprising (a) glass fiber, (b) a thickness of 100-110 μm, and (c) a Gurley permeability of at least 100 cfm; further wherein the glass fiber paper of the dry side diffusion medium is impregnated with 26-55% cured liquid phenolic resin.

5. The membrane humidifier of claim 1, wherein the glass fiber paper has a basis weight of 20-50 g/m² prior to impregnation with and curing of the liquid phenolic resin.

6. The membrane humidifier of claim 5, wherein the glass fiber paper comprises up to 10 wt % PVA fiber binder prior to curing of the liquid phenolic resin.

7. The membrane humidifier of claim 6, wherein the glass fiber paper has a basis weight of 40-44 g/m² and a cured resin content of 26-40%.

8. The membrane humidifier of claim 7, wherein the glass fiber paper has a density of at least 0.5 g/cc and a Gurley Air Permeability of at least 200 cfm.

9. The membrane humidifier of claim 6, wherein the glass fiber paper has a basis weight of 20-24 g/m² and a cured resin content of 35-55%.

10. The membrane humidifier of claim 9, wherein the glass fiber paper has a density of at least 0.5 g/cc and a Gurley Air Permeability of at least 200 cfm.

11. A flexible, resin-bonded glass fiber paper wet side diffusion medium for a membrane humidifier, the glass fiber paper comprising (a) 70-90 wt % glass fiber, (b) a thickness of 100-110 μm, and (c) a Gurley permeability of at least 100 cfm; wherein the glass fiber paper is impregnated with 25-55% cured liquid phenolic resin.

12. The wet side diffusion medium of claim 11, wherein the glass fiber paper further comprises up to 20 wt % fibrillated or nanofibrillated acrylic fiber.

13. The wet side diffusion medium of claim 12, wherein the glass fiber paper has a basis weight of 20-50 g/m² prior to impregnation with and curing of the liquid phenolic resin.

14. The wet side diffusion medium of claim 13, wherein the glass fiber paper comprises up to 10 wt % PVA fiber binder prior to curing of the liquid phenolic resin.

15. The wet side diffusion medium of claim 14, wherein the glass fiber paper has either (i) a basis weight of 40-44 g/m² and a cured resin content of 26-40%; or (ii) a basis weight of 20-24 g/m² and a cured resin content of 35-55%.

16. The wet side diffusion medium of claim 15, wherein the glass fiber paper has a density of at least 0.5 g/cc and a Gurley Air Permeability of at least 200 cfm.

* * * * *